United States Patent

Terashima et al.

[11] Patent Number: 5,108,651
[45] Date of Patent: Apr. 28, 1992

[54] FERROELECTRIC LIQUID CRYSTAL COMPOSITION

[75] Inventors: Kanetsugu Terashima; Mitsuyoshi Ichihashi; Makoto Kikuchi; Fusayuki Takeshita; Kenji Furukawa, all of Kanagawa, Japan

[73] Assignee: Chisso Corporation, Ohsaka, Japan

[21] Appl. No.: 285,521

[22] Filed: Dec. 16, 1988

[30] Foreign Application Priority Data

Dec. 25, 1987 [JP] Japan .................. 62-328717

[51] Int. Cl.$^5$ .................... C09K 19/34; C09K 19/52; C09K 19/30; C09K 19/12
[52] U.S. Cl. ...................... 252/299.61; 252/299.01; 252/299.63; 252/299.65; 252/299.66
[58] Field of Search ............. 252/299.61, 299.63, 252/299.65, 299.66, 299.01

[56] References Cited

U.S. PATENT DOCUMENTS

| | | | |
|---|---|---|---|
| 4,368,135 | 1/1983 | Osman | 252/299.63 |
| 4,490,015 | 12/1984 | Kawarada et al. | 252/299.63 |
| 4,780,240 | 10/1988 | Emoto et al. | 252/299.66 |
| 4,780,241 | 10/1988 | Furukawa et al. | 252/299.63 |
| 4,784,792 | 11/1988 | Inoue et al. | 252/299.61 |
| 4,886,620 | 12/1989 | Hopf et al. | 252/299.61 |

Primary Examiner—John S. Maples
Assistant Examiner—Philip Tucker
Attorney, Agent, or Firm—Wenderoth, Lind & Ponack

[57] ABSTRACT

A ferroelectric liquid crystal composition having a negative large dielectric anisotropy value, AC stabilizing effect at low voltages and yet high-speed response properties, and a light switching element using the composition are provided, which composition comprises at least two components at least one of which is a compound expressed by the formula

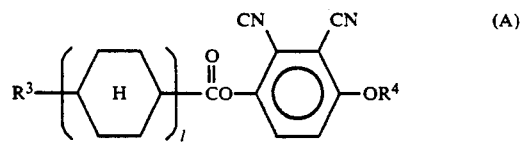

wherein $R^3$ and $R^4$ each represent the same or different linear or branched alkyl group of 1-18C and $l$ is 1 or 2, and having a negative dielectric anisotropy value.

A preferred embodiment of the above composition contains at least three components A, B and C, one of which is the above compound of the formula (A) and components B and C of which are each selected from a group of specified compounds, and the respective proportions of components A, B and C being 5-50 weight %, 20-70 weight % and 5-40 weight % based on the total weight of the three, respectively.

3 Claims, 1 Drawing Sheet

FERROELECTRIC LIQUID CRYSTAL COMPOSITION

BACKGROUND OF THE INVENTION

1. Field of the Invention

This invention relates to a ferroelectric liquid crystal composition. More particularly it relates to a ferroelectric liquid crystal composition having a negative dielectric anisotropy comprising an achiral compound having a negative dielectric anisotropy and a light switching element using the same.

2. Description of the Related Art

In recent years, liquid crystal display has come to be broadly employed for display elements, utilizing the specific features thereof, such as light weight, small power consumption, etc. However, most of these display elements utilize TN display mode using liquid crystal materials having a nematic phase; hence in the application fields where high multiplexity is required, the response time is still slow so that there has been a need for improving the elements.

In such present status, a display mode which has recently been noted is the one proposed by N. A. Clark and S. T. Lagerwall, i.e. a display mode utilizing a light switching phenomenon of ferroelectric liquid crystals (see Applied Physics, Letters, Vol. 36, p. 899 (1980)). The presence of ferroelectric liquid crystals has been stated by R. B. Meyer for the first time (see Journal de Physique, vol. 36, p. 69 (1975)), and from the viewpoint of classification of liquid crystals, the ferroelectric liquid crystals belong to chiral smectic C phase, chiral smectic I phase, chiral smectic F phase, chiral smectic G phase, chiral smectic H phase, chiral smectic J phase and chiral smectic K phase (hereinafter abbreviated to SC* phase, SI* phase, SF* phase, SG* phase, SH* phase, SJ* phase and SK* phase, respectively).

When the light switching effect of ferroelectric liquid crystals is applied to display elements, there are two superior specific features as compared with TN display mode. The first specific feature is that the response is made at a very high rate and the response time is 1/100 or less that of TN display mode elements. The second specific feature is that there is a memory effect, which makes multiplex drive easy coupled with the above-mentioned high-speed properties.

In order for display elements using ferroelectric liquid crystals to have memory properties, two methods are considered. One of these is a method proposed by N. A. Clark et al wherein memory properties are developed by reducing the cell thickness (d) down to a thickness of the helical pitch (p) or less to thereby undo the helix (Applied Physics, Letters, vol. 36, p. 899 (1980)) and the other is a method found by Le Piesant wherein memory properties are developed by utilizing AC stabilizing effect (Paris Liquid Crystal Conference, p. 217 (1984)). The word AC means alternate current hereinafter.

Most current ferroelectric liquid crystal materials have short helical pitches (1 to 3 μm); hence in order to develop memory properties by reduction in the thickness of the cell, proposed by N. A. Clark et al, it is necessary to retain the cell thickness at about 1 to 3 μm, but from the viewpoint of the current cell preparation technique, there is a problem that the retention is difficult in the aspects of cost and yield. On the other hand, the method found by Le Piesant wherein memory properties are developed utilizing AC stabilizing effect is effective only for ferroelectric liquid crystal materials having a negative dielectric anisotropy ($\Delta\epsilon$), but even in the case of thick cells (5 to 7 μm), it is possible to develop memory properties; thus the current cell preparation technique is utilizable and hence the method is very practical.

The AC stabilizing effect is due to a mode utilizing the following fact:

Spontaneous polarization (Ps) results from an impressed electric field in the case where low frequency is applied to ferroelectric liquid crystals, whereas spontaneous polarization does not follow in the case of high frequency; as a result, normal dielectric anisotropy becomes effective and hence if the dielectric anisotropy value is negative ($\Delta\epsilon < 0$) liquid crystal molecules are compelled to be in a parallel state to the substrate. Thus, memory properties are developed even in the case of a thick cell. A matrix display utilizing this AC stabilizing effect has been actually reported by Jeary in 1985 for the first time (SID'85, Digest, p. 128 (1985)), but thereafter almost no report has been issued. The main reason for so few reported examples is that there are so few ferroelectric liquid crystal materials having a negative dielectric anisotropy value. Further, according to Jeary's report, a voltage of about 40 V is required for developing memory properties by utilizing AC stabilizing effect, but when usual IC drive voltage range is taken into account, it is desired that AC stabilizing effect be developed at a far lower voltage (25 V or less). As to AC stabilizing effect, the more the negative dielectric anisotropy value, the lower the voltage of the effect developed; hence appearance of ferroelectric liquid crystal materials having a negative larger dielectric anisotropy value has been earnestly desired. Further, the response time of ferroelectric liquid crystal materials reported by Jeary et al is several msecs, that is, the response time is still slow in the aspect of practical use; hence appearance of ferroelectric liquid crystals having a negative dielectric anisotropy value and also high-speed response properties has been desired.

SUMMARY OF THE INVENTION

A first object of the present invention is to provide a ferroelectric liquid crystal composition having a negative large dielectric anisotropy value, an AC stabilizing effect at lower voltages and yet high-speed response properties.

A second object of the present invention is to provide a light switching element using the abovementioned liquid crystal composition.

The present inventors have conducted extensive research in order to solve the above-mentioned problems, and as a result, have found that when certain liquid crystal compounds are combined together as shown below, a ferroelectric liquid crystal composition having a negative large dielectric anisotropy value and yet high-speed response properties is obtained, and have achieved the present invention.

The present invention in a first aspect resides in a ferroelectric liquid crystal composition having a negative dielectric anisotropy value and comprising at least two components at least one of which is a compound expressed by the formula (A)

wherein $R^3$ and $R^4$ each represent the same or different linear or branched chain alkyl group each of 1 to 18 carbon atoms and l represents 1 or 2, having a negative dielectric anisotropy value and being contained in the composition in an amount of 5% by weight or more. As a preferable embodiment of the above-mentioned liquid crystal composition, there is provided a ferroelectric liquid crystal composition having a negative dielectric anisotropy value and comprising at least the following three components A, B and C in proportions of 5 to 40% by weight of component A, 20 to 70% by weight of component B and 5 to 40% by weight of component C:

component A being a compound expressed by the above-mentioned formula (A);

component B being at least one member of a compound expressed by the formula (B-1)

wherein $R^5$ and $R^6$ each represent the same or different linear or branched chain alkyl group or alkoxy group each of 1 to 18 carbon atoms, a compound expressed by the formula (B-2)

wherein $R^7$ and $R^8$ each represent the same or different linear or branched chain alkyl group or alkoxy group each of 1 to 18 carbon atoms, a compound expressed by the formula (B-3)

wherein $R^9$ and $R^{10}$ each represent the same or different linear or branched chain alkyl group or alkoxy group each of 1 to 18 carbon atoms, or a compound expressed by the formula (B-4)

wherein $R^{11}$ represents a linear or branched chain alkyl group or alkoxy group each of 1 to 18 carbon atoms, Z represents a direct bond or —O—, k represents 0 to 10 and (±) indicates racemic compounds; and component C being at least one member of a compound expressed by the formula (C-1)

wherein $R^{12}$ represents a linear or branched chain alkyl group or alkoxy group each of 1 to 18 carbon atoms, $R^{13}$ represents a linear or branched chain alkyl group of 2 to 18 carbon atoms, W represents —H, —F or —CN and * indicates an asymmetric carbon atom, a compound expressed by the formula (C-2)

wherein $R^{14}$ represents a linear or branched chain alkyl group or alkoxy group each of 1 to 18 carbon atoms, $R^{15}$ represents a linear or branched chain alkyl group of 2 to 18 carbon atoms, V represents —H, —F or —CN and * indicates an asymmetric carbon atom, a compound expressed by the formula (C-3)

wherein $R^{16}$ represents a linear or branched chain alkyl group or alkoxy group each of 1 to 18 carbon atoms, $R^{17}$ represents an alkyl group of 1 to 18 carbon atoms and * indicates an asymmetric carbon atom, or a compound expressed by the formula (C-4)

wherein $R^{18}$ represents a linear or branched chain alkyl group or alkoxy group each of 1 to 18 carbon atoms, $R^{19}$ represents a linear or branched chain alkyl group of 2 to 18 carbon atoms or an alkoxy group of 1 to 18 carbon atoms and * indicates an asymmetric carbon atom.

The present invention in a second aspect resides in a light switching element comprising the above-mentioned ferroelectric liquid crystal composition having a negative dielectric anisotropy value, and utilizing AC stabilizing effect.

DESCRIPTION OF THE DRAWINGS

FIG. 1 shows graphs illustrating AC stabilizing effect of the ferroelectric liquid crystal composition of the present invention wherein 1(a) shows a graph illustrating the wave of impressed voltage, 1(b) shows a graph illustrating the memory properties of a ferroelectric liquid crystal composition composed mainly of components B and C but containing no component A; and 1(c) shows a graph illustrating memory properties of a ferroelectric liquid crystal composition having component A added to the above-mentioned composition.

DETAILED DESCRIPTION OF PREFERRED EMBODIMENTS

Since the compound expressed by the formula (A) in the present invention has a large dipole moment (represented by CN) in the perpendicular direction to the molecules, it has a very notable characteristic. A patent application for this compound, which has been laid open, has previously been applied for by the present applicants (e.g. Japanese patent application laid-open Nos. Sho 55-66556/1980, Sho 55-102550/1980 and Sho 59-10557/1984).

The compound expressed by the formula (A) exhibits a nematic phase or smectic A phase and exhibits no SC phase, but it has a negative dielectric anisotropy value as very large as $-20$ to $-25$; hence it plays an important role of causing AC stabilizing effect to develop at low voltages in the ferroelectric liquid crystal composition of the present invention. Representative examples of the compound expressed by the formula (A) are shown in the following Tables 1 and 2. Table 1 showing compounds of the formula (A) wherein $l=1$ and expressed by the formula and Table 2 showing those wherein $l=2$ and expressed by the formula

TABLE 1

| $R^3$ | $R^4$ | $R^3$ | $R^4$ |
|---|---|---|---|
| $C_3H_7-$ | $-C_5H_{11}$ | $C_5H_{11}-$ | $-C_6H_{13}$ |
| " | $-C_6H_{13}$ | " | $-C_7H_{15}$ |
| $C_4H_9-$ | $-C_3H_7$ | $C_6H_{13}-$ | $-C_4H_9$ |
| " | $-C_4H_9$ | " | $-C_5H_{11}$ |
| " | $-C_5H_{11}$ | " | $-C_6H_{13}$ |
| " | $-C_6H_{13}$ | " | $-C_7H_{15}$ |
| " | $-C_7H_{15}$ | $C_7H_{15}-$ | $-C_3H_7$ |
| $C_5H_{11}-$ | $-C_3H_7$ | " | $-C_4H_9$ |
| " | $-C_4H_9$ | " | $-C_5H_{11}$ |
| " | $-C_5H_{11}$ | " | $-C_6H_{13}$ |

TABLE 2

| $R^3$ | $R^4$ | $R^3$ | $R^4$ |
|---|---|---|---|
| $C_3H_7-$ | $-C_2H_5$ | $C_5H_{11}-$ | $-C_5H_{11}$ |
| " | $-C_3H_7$ | " | $-C_6H_{13}$ |
| " | $-C_4H_9$ | " | $-C_7H_{15}$ |
| " | $-C_5H_{11}$ | $C_7H_{15}-$ | $-C_2H_5$ |
| " | $-C_6H_{13}$ | " | $-C_3H_7$ |
| " | $-C_7H_{15}$ | " | $-C_4H_9$ |
| $C_5H_{11}-$ | $-C_2H_5$ | " | $-C_5H_{11}$ |
| " | $-C_3H_7$ | " | $-C_6H_{13}$ |
| " | $-C_4H_9$ | " | $-C_7H_{15}$ |

As described above, the present invention consists in that the compound expressed by the formula (A) and having a negative dielectric anisotropy value is contained in ferroelectric liquid crystal compositions, and particularly when component A expressed by the general formula (A), component B expressed by the formulas (B-1) to (B-4) and component C expressed by the formulas (C-1) to (C-4) are combined together, then a ferroelectric liquid crystal composition having an even larger negative dielectric anisotropy value larger and yet having high-speed response properties is obtained.

As described above, the achiral compound as component A has a negative dielectric anisotropy value as large as $-20$ to $-25$ and plays an important role in the ferroelectric liquid crystal composition of the present invention in that it develops a negative large dielectric anisotropy value and exhibits AC stabilizing effect and as a result, generates good memory properties. Component A exhibits no SC phase and when it is used in a too high concentration, the upper limit temperature of SC* phase in the ferroelectric liquid crystal composition is lowered; hence too high a concentration is undesirable. Thus, when the use object of component A is taken into consideration, the concentration of component A used in the present invention is preferably 40% by weight or less.

Compounds expressed by the formulas (B-1), (B-2), (B-3) and (B-4) as component B are achiral compounds and play a role of basic SC compound in the present invention.

Phenylpyrimidine compounds expressed by the formula (B-1) have SC phase within a low temperature region. For example, in the case of a compound of $R^5=C_6H_{13}O-$ and $R^6=C_8H_7-$ , the phase transition points of the compound are as follows:

On the other hand, biphenylpyrimidine compounds expressed by the formula (B-2) have SC phase within a high temperature region. For example, in the case of a compound of $R^7=C_7H_{15}-$ and $R^8=C_8H_{17}-$ , the phase transition points are as follows:

In the above phase transition temperature, Cr, N and Iso represent crystal, nematic phase and isotropic liquid, respectively.

Thus, when a compound expressed by the formula (B-1) is combined with a compound expressed by the formula (B-2), there is obtained a basic SC mixture having SC phase over a range from a low temperature region to a high temperature region.

The compounds having a core of (B-1) or that of (B-2) have a superior specific feature of a very low viscosity as already described in Japanese patent application laid-open No. Sho 61-291,679/1986 filed by the present inventors; hence the compounds also each play an important role as a basic SC compound in the ferroelectric liquid crystal composition of the present invention.

As the compound expressed by the formula (B-1), those wherein $R^5$ represents a linear alkoxy group of 6 to 12 carbon atoms and $R^6$ represents a linear alkyl of 8 to 11 carbon atoms and have SC phase are particularly preferred.

On the other hand, phenylpyridine compounds expressed by the formula (B-3) have SC phase and the like over a broad temperature range from a low temperature region to high temperature region and, e.g. in the case of a compound of $R^9=C_7H_{15}$- and $R^{10}=C_7H_{15}$- , the phase transition points are as follows:

Further, biphenyl compounds expressed by the formula (B-4) have SC phase and the like within a low temperature region and e.g. a compound of $R^{11}=C_7H_{15}$- , Z=single bond and k=3 has the following phase transition points:

Compounds having a core of the general formula (B-3) or that of the formula (B-4) have a superior specific feature as already described in EP 86108267 by the present inventors and also have a very low viscosity similar to those of the above-mentioned pyrimidine compounds; hence the compounds also play a role as a basic SC compound in the ferroelectric liquid crystal composition of the present invention and are used for adjusting tee SC phase temperature range, if necessary.

As the phenylpyridine compounds expressed by the formula (B-3), those wherein $R^9$ represents an alkyl group of 4 to 10 carbon atoms and $R^{10}$ represents an alkoxy group of 4 to 12 carbon atoms are particularly preferred. Further, as the biphenyl compounds expressed by the formula (B-4), those wherein $R^{11}$ represents an alkoxy group of 7 to 10 carbon atoms, Z represents a single bond and k represents 3 and having SC phase are particularly preferred.

As the pyrimidine compounds of the formula (B-1) or (B-2) used as a component of the ferroelectric liquid crystal composition of the present invention, those having SC phase are preferred as described, but even those exhibiting no SC phase may also be used if the quantity thereof is within a range where the SC phase temperature range of smectic compositions to be obtained is not notably narrowed.

This applies to phenylpyridine compounds expressed by the formula (B-3) or biphenyl compounds expressed by the formula (B-4), each exhibiting no SC phase, and these compounds may be used for viscosity reduction or adjustment of SC phase temperature range.

When it is taken into consideration that the use object of the compound of component B is to use it as a base SC compound, the concentration of component B used in the present invention is preferably 70% by weight or less.

Compounds of component C expressed by the formulas (C-1), (C-2), (C-3) or (C-4) are chiral compounds, and a patent application for compounds expressed by the formulas (C-1) or (C-2), which has been laid open, has already been applied for by the present applicants and (e.g. Japanese patent application laid-open Nos. Sho 61-43/1986, Sho 61-210056/1986 and Sho 63-48254/1988). The compounds exhibit SC* phase within a high temperature region, have a large tilt angle and a very large spontaneous polarization value. For example, a compound of the formula (C-1) wherein $R^{12}=C_8H_{17}O$- , $R^{13}=$-$C_6H_{13}$ and W=-F has the following phase transition points:

and a tilt angle of 34.5° and a Ps of 132 nC/cm² (T−Tc=−30° C.).

A compound of the formula (C-1) wherein $R^{12}=C_6H_{13}O$- , $R^{13}=$-$C_6H_{13}$ and W=-H has the following phase transition temperatures:

and a tilt angle of 38.1° and a Ps of 110 nC/cm² (T−Tc=−30° C.).

A compound of the formula (C-1) wherein $R^{12}=C_8H_{17}O$-$R^{13}=C_6H_{13}$ and W=-CN has the following phase transition points:

and a tilt angle of 25° and a Ps of 240 nC/cm ² (T−Tc=−30° C.).

Further a compound of the formula (C-2) wherein $R^{14}=C_8H_{17}O$- , $R^{15}=$-$C_6H_{13}$ and V=-F has the following phase transition points:

and a tilt angle of 36.5° and a Ps of 109 nC/cm² (T−Tc=−30° C.).

A compound of the formula (C-2) wherein $R^{14}=C_8H_{17}O$- , $R^{15}=$-$C_6H_{13}$ and V=-H has the following phase transition points:

and a tilt angle of 45° and a Ps of 39 nC/cm² (T−Tc=−30° C.).

A compound of the formula (C-2) wherein $R^{14}=C_8H_{17}$- , $R^{15}=$-$C_6H_{13}$ and V=-CN have the following phase transition points:

and a tilt angle of 22° and a Ps of 137 nC/cm² (T−Tc=−15° C.).

Thus, the compounds of the formulas (C-1) or (C-2) play important roles of development of high-speed response properties, improvement in the tilt angle and improvement in the upper limit temperature of SC* phase in the ferroelectric liquid crystal composition of in the present invention.

On the other hand, a patent application, not yet laid open, for the compounds expressed by the formulas (C-3) or (C-4) has already been applied for by the present inventors and (e.g. Japanese patent application Nos. Sho 61-133269/1986, Sho 62-049796/1987, etc.). The compounds have a very large spontaneous polarization value (extrapolated value: about 100 nC/cm$^2$) and far superior response properties. Thus, the compounds play an important role of development of high-speed response properties in the ferroelectric liquid crystal composition of the present invention. When the concentration of components A and B used and also the utility of component C are taken into consideration, the concentration of component C used in the present invention is preferably 40% by weight or less.

The respective proportions of components A, B and C having made use of the above-mentioned specific features of these components to obtain the objective liquid crystal composition having superior specific features have been variously examined, and as a result, it has been found that a concentration of component A in the range of 5 to 40% by weight, that of component B in the range of 20 to 70% by weight and that of component C in the range of 5 to 40% by weight as described above are preferred.

The present invention will be described in more detail by way of Examples, but it should not be construed to be limited thereto.

In the Examples, the spontaneous polarization value (Ps) was measured according to Sawyer-Tower method; the helical pitch (P) was sought by directly measuring the distance between the dechiralization lines corresponding to the helical pitch under a polarizing microscope; and the tilt angle ($\theta$) was sought from the moved angle (corresponding to $2\theta$) of the extinction site under crossed nicols by impressing an electric field sufficiently higher than the critical one upon the homogeneously aligned cell to extinguish the helical structure and further inverting the polarity.

The response time was measured from the change in the intensity of transmitted light observed when the respective compositions were filled in a cell subjected to an aligning treatment and having a distance between the electrodes of 2 $\mu$m and a square wave having a $V_{pp}$ (Voltage of peak to peak) of 20 V and 100 Hz was impressed.

The dielectric anisotropy value was calculated by using a cell subjected to a parallel aligning treatment and a vertical aligning treatment and measuring the dielectric constant from the capacity of the empty cell and the capacity in the case where a liquid crystal was filled therein.

EXAMPLE 1

A ferroelectric liquid crystal composition D composed mainly of components B and C used in the present invention and having the following proportions of the components was prepared:

| Composition D | |
|---|---|
| $C_6H_{13}O$—⬡—⬡(N,N)—$C_8H_{17}$ | 17.5 wt. % |
| $C_9H_{19}O$—⬡—⬡(N,N)—$C_7H_{15}$ | 5 wt. % |
| $C_9H_{19}O$—⬡—⬡(N,N)—$C_8H_{17}$ | 10 wt. % |
| $C_5H_{11}$—⬡—⬡—⬡(N,N)—$C_6H_{13}$ | 10 wt. % |
| $C_7H_{15}$—⬡—⬡—⬡(N,N)—$C_6H_{13}$ | 7.5 wt. % |
| (S) $C_6H_{13}$—⬡—OC(O)—⬡—⬡(F)—OCH(CH$_3$)C$_6$H$_{13}$ | 20 wt. % |

Composition D

Figure 1A:
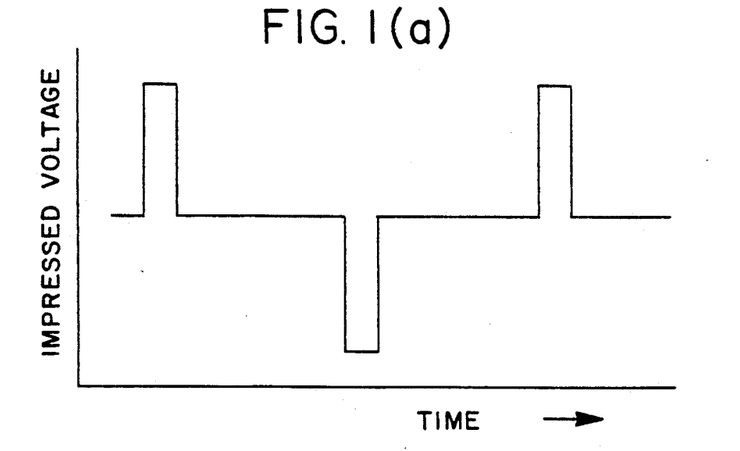
Figure 1B:
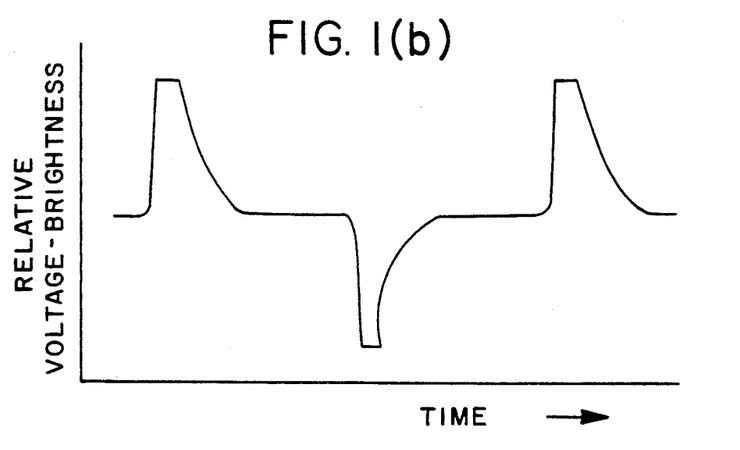

This ferroelectric liquid crystal composition D exhibited SC* phase within a temperature region of −21° to +56° C., exhibited SA phase on the higher temperature side thereof, formed N* phase at 68° C. and formed isotropic liquid at 73° C. At 25° C., it had a spontaneous polarization value of 8.5 nC/cm², a tilt angle of 25° and a response time of 15 μsec (electrolytic intensity: E=±0.5 V/μm). Further, its dielectric anisotropy value was +0.5. This composition D was filled in a cell provided with two substrates having transparent electrodes each surface of which was subjected to rubbing treatment and having a cell thickness of 5 μm to prepare an electrooptical element. This element was placed between two crossed polarizers and a pulse wave (pulse width: 600 μsec and wave height value: 25 V) as shown in FIG. 1(a) was impressed. As a result, no memory properties were observed (see FIG. 1(b)). Thus, an AC wave of 20 KHz and 25 V was overlapped with the above pulse wave to observe change in the level of transmitted light. As a result, no memory properties were similarly observed and change in the intensity of transmitted light as shown in FIG. 1(b) was observed. Thus, to the composition D was added the following achiral compound as component D of the present invention having a negative dielectric anisotropy value to prepare a ferroelectric liquid crystal composition E:

Composition E:
composition D                     95 weight %
and 5 wt. %

This ferroelectric liquid crystal composition E exhibited SC* phase within a temperature region of −22° to +53° C., exhibited SA phase on the higher temperature side, formed N* phase at 60° C. and formed isotropic liquid at 69° C. At 25° C., it had a spontaneous polarization value of 7.5 nC/cm², a tilt angle of 22° and a response time of 230 μsec (E=±5 V/μm). Further, its dielectric anisotropy value was −2.

Figure 1C:
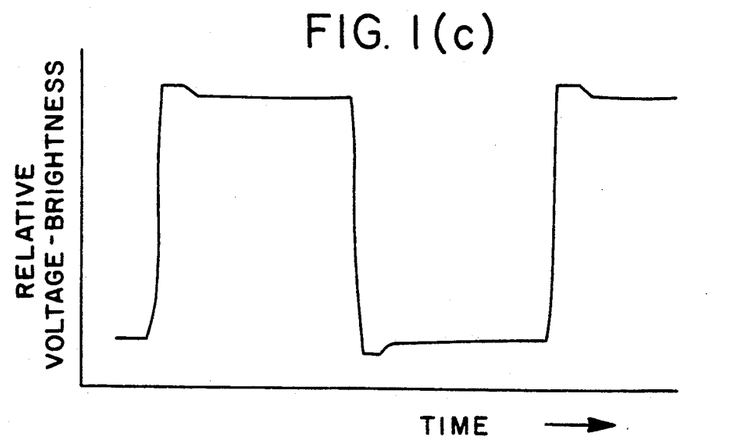

This composition E was filled in a cell similar to that in the case of the composition D, followed by impressing a pulse wave shown in FIG. 1(a). As a result, no memory properties were observed as in the case of composition D (see FIG. 1(b)). Whereas, when an AC wave of 20 KHz and 25 V was overlapped with the wave shown in FIG. 1(a), good memory properties as shown in FIG. 1(c) were observed. This fact may be interpreted as follows:

when the compound having a negative dielectric anisotropy value as component A of the present invention was added, the resulting ferroelectric liquid crystal composition had a negative larger dielectric anisotropy value, and as a result, AC stabilizing effect was notably developed to afford superior memory properties. The response time was shorter (about ¼) and yet AC voltage was lower (about ½) as compared with the results of the report of Jeary; hence it has been found that the ferroelectric liquid crystal composition of the present invention is very practical.

EXAMPLES 2-7

The proportions of the ferroelectric liquid crystal compositions Nos. 1-6 of the present invention are shown in Table 3 and the specific features thereof are shown in Table 4. In addition, the respective proportions in Table 3 all refer to percentage by weight.

TABLE 3

| Component | Formula | Compounds | Composition No. and proportions (% by weight) | | | | | |
|---|---|---|---|---|---|---|---|---|
| | | | 1 | 2 | 3 | 4 | 5 | 6 |
| A | A |  | | | | 5 | 5 | 5 |
| | A |  | | | | 5 | 5 | 5 |
| | A |  | | | | | | 5 |
| | A |  | | | | | | 5 |
| | A |  | | | | | 5 | 5 |
| | A |  | 5 | 5 | 5 | 5 | 5 | 5 |
| | A |  | | 5 | 5 | 5 | 5 | 5 |
| B | B-1 |  | 12.4 | 12.2 | 5 | 4.4 | 4.1 | 3.6 |
| | B-1 |  | 8.6 | 8 | | | | |
| | B-1 |  | 4.3 | 4.1 | | | | |
| | B-1 |  | 4.3 | 4.1 | | | | |

TABLE 3-continued

| Component | Formula | Compounds | Composition No. and proportions (% by weight) | | | | | |
|---|---|---|---|---|---|---|---|---|
| | | | 1 | 2 | 3 | 4 | 5 | 6 |
| | B-2 | C$_5$H$_{11}$—⟨⟩—⟨⟩—⟨N,N⟩—C$_8$H$_{17}$ | 8.6 | 8 | | | | |
| | B-2 | C$_7$H$_{15}$—⟨⟩—⟨⟩—⟨N,N⟩—C$_8$H$_{17}$ | 4.3 | 4.1 | | | | |
| | B-2 | C$_5$H$_{11}$—⟨⟩—⟨⟩—⟨N,N⟩—C$_6$H$_{13}$ | | | 5 | 4.4 | 4.1 | 3.6 |
| | B-2 | C$_6$H$_{13}$—⟨⟩—⟨⟩—⟨N,N⟩—C$_6$H$_{13}$ | | | 5 | 4.4 | 4.1 | 3.6 |
| | B-2 | C$_7$H$_{15}$—⟨⟩—⟨⟩—⟨N,N⟩—C$_6$H$_{13}$ | | | 5 | 4.4 | 4.1 | 3.6 |
| | B-2 | C$_8$H$_{17}$—⟨⟩—⟨⟩—⟨N,N⟩—C$_6$H$_{13}$ | | | 5 | 4.4 | 4.1 | 3.6 |
| | B-3 | C$_7$H$_{15}$—⟨N⟩—⟨⟩—OC$_4$H$_9$ | | | 5 | 4.4 | 4.1 | 3.6 |
| | B-3 | C$_7$H$_{15}$—⟨N⟩—⟨⟩—OC$_8$H$_{17}$ | | | 5 | 4.4 | 4.1 | 3.6 |
| | B-3 | C$_7$H$_{15}$—⟨N⟩—⟨⟩—OC$_{11}$H | | | 5 | 4.4 | 4.1 | 3.6 |
| | B-3 | C$_8$H$_{17}$—⟨N⟩—⟨⟩—OC$_8$H$_{17}$ | | | 5 | 4.4 | 4.1 | 3.6 |
| | B-3 | C$_{10}$H—⟨N⟩—⟨⟩—OC$_{12}$H | | | 5 | 4.4 | 4.1 | 3.6 |
| | B-4 | C$_8$H$_{17}$O—⟨⟩—⟨⟩—(CH$_2$)$_3$—CH(CH$_3$)C$_2$H$_5$ (±) | 14.3 | 13.5 | | | | |

TABLE 3-continued

| Component | Formula | Compounds | 1 | 2 | 3 | 4 | 5 | 6 |
|---|---|---|---|---|---|---|---|---|
| C | C-1 |  (S) C7H15—⌬—OC(=O)—⌬—⌬—OC*H(CH3)C6H13 | 14.3 | 13.5 | 4.5 | 4 | 3.8 | 3.3 |
|   | C-1 |  (S) C6H13—⌬—OC(=O)—⌬—⌬(F)—OC*H(CH3)C6H13 |   |   | 9 | 8 | 7.5 | 6.5 |
|   | C-1 |  (S) C7H15—⌬—OC(=O)—⌬—⌬(F)—OC*H(CH3)C6H13 |   |   | 4.5 | 4 | 3.8 | 3.1 |
|   | C-3 |  (S) C8H17O—⌬—⌬—OCH2C*H(CH3)OC(=O)C4H9 |   |   | 9 | 4 | 7.5 | 6.5 |
|   | C-4 |  (S,S) C8H17O—⌬—⌬—OCH2C*H(CH3)OC(=O)C*H(OCH3)C4H9 |   |   |   | 4 |   |   |
| Others |   |  (S) C12H25—⌬—⌬(N=N)—OC*H(CH3)C6H13 | 4.8 | 4.5 |   |   |   |   |
|   |   |  (S) C7H15—⌬—C(=O)O—⌬—⌬—C(=O)OCH2C*H(CH3)CH2C5 | 4.8 | 4.5 |   |   |   |   |
|   |   |  (S) C8H17—⌬—OCH2—⌬—⌬—CH2C*H(CH3)C6H13 | 4.8 | 4.5 |   |   |   |   |
|   |   |  (S) C7H15—⌬—C(=O)O—⌬—⌬—OCH2C*H(CH3)C2H5 | 9.5 | 9 |   |   |   |   |
|   |   |  (S) C8H17—pyr—⌬(F)—O—(CH2)5C*H(CH3)C2H5 |   |   | 9 | 8 | 7.5 | 6.5 |
|   |   |  (S) C8H17—pyr—⌬(F)—O—(CH2)4C*H(CH3)C2H5 |   |   | 4 | 4 | 3.9 | 3.1 |

TABLE 4

| Characteristics | Composition No. | | | | | |
| --- | --- | --- | --- | --- | --- | --- |
|  | 1 | 2 | 3 | 4 | 5 | 6 |
| Phase transition point (°C.) | | | | | | |
| Cr → SC* | −18 | −19 | −24 | −36 | −35 | −28 |
| SC* → SA | 63 | 66 | 65 | 59 | 62 | 49 |
| SA → N* | 68 | 68 | 74 | 69 | 68 | 64 |
| N* → Iso | 81 | 84 | 81 | 80 | 82 | 77 |
| Spontaneous (nC/cm)* polarization value | 6 | 6 | 15 | 16 | 16 | 7 |
| Tilt angle (°)* | 22 | 21 | 21 | 23 | 23 | 17 |
| Helical (μm)* pitch | 2 | 2 | 4 | 3 | 3 | 2 |
| Response (μsec)* time | 275 | 563 | 130 | 400 | 430 | 675 |
| Dielectric* anisotropy | −2 | −3 | −4 | −5 | −7 | −9 |

*Values at 25° C.

In addition, Table 3 also includes compositions containing chiral compounds having the objective of elongating the helical pitch of SC* phase or broadening the temperature region of SC* phase, but it does not damage the specific features of the ferroelectric liquid crystal composition of the present invention to contain such chiral substances in the composition, which therefore raise no problem.

A ferroelectric liquid crystsl composition No. 3 of the present invention was filled in a cell provided with transparent electrodes each obtained by coating PVA as an aligning agent and rubbing the resulting surface to subject it to a parallel aligning treatment and having a cell gap of 5 μm, followed by placing the resulting liquid crystal cell between two polarizers arranged at crossed nicol state and causing a pulse wave having a pulse width of 400 μsec and a wave height value of 25 V to overlap with an AC wave of 20 KHz and 20 V. As a result, a good AS stabilizing effect was observed to obtain a liquid crystal display element having good memory properties and also a contrast ratio as very good as 1:20.

According to the present invention, a ferroelectric liquid crystal composition which makes the negative spontaneous polarization value larger, has AC stabilizing effect and yet has high-speed response properties, and a light switching element using the above composition are obtained. As the use applications of the ferroelectric liquid crystal composition of the present invention, a high-speed shutter, a high-multiplex liquid crystal display, etc. are exemplified.

What we claim is:

1. A ferroelectric liquid crystal composition which comprises at least the following three components A, B and C in proportions of 5 to 40% by weight of component, A, 20 to 70% by weight of component B and 5 to 40% by weight of component C, and having a negative dielectric anisotropy value:

component A being a compound expressed by the formula wherein $R^3$ and $R^4$ each represent the same or different linear or branched chain alkyl group each of 1 to 18 carbon atoms, and l represents 1 or 2;

component B being at least one member selected from the group consisting of a compound expressed by the formula wherein $R^5$ and $R^6$ each represent the same or different linear or branched chain alkyl group or alkoxy group each of 1 to 18 carbon atoms, a compound expressed by the formula wherein $R^7$ and $R^8$ each represent the same or different linear or branched chain alkyl group or alkoxy group each of 1 to 18 carbon atoms, a compound expressed by the formula wherein $R^9$ and $R^{10}$ each represent the same or different linear or branched chain alkyl group or alkoxy group each of 1 to 18 carbon atoms, and a compound expressed by the formula wherein $R^{11}$ represents a linear or branched chain alkyl group or alkoxy group each of 1 to 18 carbon atoms, Z represents a direct bond or —O—, k represents 0 to 10, and (±) indicates racemic compounds; and component C being at least one member selected from the group consisting of a compound expressed by the formula (C-1)

wherein $R^{12}$ represents a linear or branched chain alkyl group or alkoxy group each of 1 to 18 carbon atoms, $R^{13}$ represents a linear or branched chain alkyl group of 2 to 18 carbon atoms, W represents —H, —F or —CN, and * indicates an asymmetric carbon atoms, a compound expressed by the formula (C-2)

wherein $R^{14}$ represents a linear or branched chain alkyl group or alkoxy group each of 1 to 18 carbon atoms, $R^{15}$ represents a linear or branched chain alkyl group of 2 to 18 carbon atoms, V represents —H, —F or —CN, and * indicates an asymmetric carbon atoms, a compound expressed by the formula (C-3)

wherein $R^{16}$ represents a linear or branched chain alkyl group or alkoxy group each of 1 to 18 carbon atoms, $R^{17}$ represents an alkyl group of 1 to 18 carbon atoms, and * indicates an asymmetric carbon atom, and a compound expressed by the formula (C-4)

wherein $R^{18}$ represents a linear or branched chain alkyl group or alkoxy group each of 1 to 18 carbon atoms, $R^{19}$ represents a linear or branched chain alkyl group of 2 to 18 carbon atoms or an alkoxy group of 1 to 18 carbon atoms, and * indicates an asymmetric carbon atom.

2. A ferroelectric liquid crystal composition according to claim 1, wherein $R^3$ and $R^4$ in the formula (A) each represent a linear alkyl group of 3 to 7 carbon atoms.

3. A light switching element using a ferroelectric liquid crystal composition according to claim 1, wherein AC stabilizing effect is utilized.

* * * * *